United States Patent
Zhang et al.

(10) Patent No.: US 12,287,406 B2
(45) Date of Patent: Apr. 29, 2025

(54) METHODS AND SYSTEMS FOR GEO-REFERENCING MAPPING SYSTEMS

(71) Applicant: Carnegie Mellon University, Pittsburgh, PA (US)

(72) Inventors: Ji Zhang, Pittsburgh, PA (US); Calvin Wade Sheen, Chula Vista, CA (US); Kevin Joseph Dowling, Gibsonia, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 18/376,874

(22) Filed: Oct. 5, 2023

(65) Prior Publication Data
US 2024/0036203 A1    Feb. 1, 2024

Related U.S. Application Data

(60) Division of application No. 16/842,130, filed on Apr. 7, 2020, now Pat. No. 11,815,601, which is a continuation of application No. PCT/US2018/061186, filed on Nov. 15, 2018.

(60) Provisional application No. 62/587,983, filed on Nov. 17, 2017.

(51) Int. Cl.
| | |
|---|---|
| *G06V 20/64* | (2022.01) |
| *G01S 17/42* | (2006.01) |
| *G01S 17/58* | (2006.01) |
| *G01S 17/894* | (2020.01) |
| *H04W 4/02* | (2018.01) |

(52) U.S. Cl.
CPC .............. *G01S 17/58* (2013.01); *G01S 17/42* (2013.01); *G01S 17/894* (2020.01); *H04W 4/023* (2013.01)

(58) Field of Classification Search
CPC .......... G06T 19/00; G06T 7/70; G06T 7/194; G06T 7/00; G06T 7/20; G06T 7/579; G06T 15/00; G06T 7/521; G06T 7/80; G06V 20/58; G06V 10/98; G06V 10/75; G06V 10/25; G06V 10/22; G06V 20/64; G06V 10/764; G06V 20/56; G06V 10/26; G06V 10/74; G06V 10/46; G06V 10/94
See application file for complete search history.

(56) References Cited

U.S. PATENT DOCUMENTS

2016/0379366 A1* 12/2016 Shah .................... G06T 7/50
345/419

* cited by examiner

*Primary Examiner* — Tu X Nguyen
(74) *Attorney, Agent, or Firm* — David G. Oberdick; Chiara F. Orsini

(57) ABSTRACT

A method includes receiving a trajectory dataset including a plurality of geospatial points forming a point cloud and acquired along a trajectory wherein for each of the plurality of geospatial points there is a defined an x-coordinate, a y-coordinate and a z-coordinate and at least one mapping device orientation attribute, segmenting the trajectory dataset into a plurality of segments, determining at least one relative constraint for each of the plurality of segments and utilizing, for each of the plurality of segments, at least one of the determined relative constraints to determine a relative position of at least two of the plurality of segments.

9 Claims, 6 Drawing Sheets

| Receive a trajectory dataset comprising a plurality of geospatial points forming a point cloud and acquired along a trajectory wherein for each of the plurality of geospatial points there is a defined an x-coordinate, a y-coordinate and a z-coordinate and at least one mapping device orientation attribute. | 500 |
|---|---|
| Segment the trajectory dataset into a plurality of segments. | 502 |
| Determine at least one relative constraint for each of the plurality of segments. | 504 |
| Utilize, for each of the plurality of segments, at least one of the determined relative constraints to determine a relative position of at least two of the plurality of segments. | 506 |

Fig. 5

Derive a first trajectory file comprising point cloud data created by a mapping system operated along a first trajectory. — 600

Derive a second trajectory file comprising position information from a GPS data source along a second trajectory. — 602

Synchronize the point cloud data with the position information. — 604

Utilize the second trajectory file to correct the point cloud data. — 606

Fig. 6

METHODS AND SYSTEMS FOR GEO-REFERENCING MAPPING SYSTEMS

STATEMENT OF PRIORITY

This application is a divisional of Ser. No. 16/842,130 entitled "METHODS AND SYSTEMS FOR GEO-REFERENCING MAPPING SYSTEMS", filed on Apr. 7, 2020.

U.S. application Ser. No. 16/842,130 is a bypass continuation of PCT/US18/61186 entitled "METHODS AND SYSTEMS FOR GEO-REFERENCING MAPPING SYSTEMS", filed on Nov. 15, 2018.

PCT Application No. PCT/US18/61186 claims priority to U.S. Provisional No. 62/587,983 entitled "METHODS AND SYSTEMS FOR GEO-REFERENCING MAPPING SYSTEMS," filed on Nov. 17, 2017.

The disclosures of all patents and applications referred to herein are each incorporated herein by reference in their entireties and for all purposes.

CROSS REFERENCE TO RELATED APPLICATION

The use of Simultaneous localization and mapping (SLAM) devices in the production of point clouds is described, for example, in WO 2019/018315, entitled "ALIGNING MEASURED SIGNAL DATA WITH SLAM LOCALIZATION DATA AND USES THEREOF," published on Jan. 24, 2019, which is incorporated herein by reference in its entirety and for all purposes.

BACKGROUND

Field

The methods and systems described herein generally relate to multi-modal map-based location detection.

Description of the Related Art

Accurate maps of interior and exterior environments are required for a wide variety of applications including navigation and guidance of vehicles, mobile robots, and general location-finding, modeling, and identification purposes. In addition, as-built 2D and 3D models of these environments are often required for construction, renovation, and planning purposes. Today, these environments are often modeled through laborious manual methods or through expensive stationary laser distance and ranging (lidar) devices that require post-processing to create the map. These methods are used to create floor plans, 2D CAD models, and 3D CAD models.

One common method to locate and track positions on Earth includes the Global Positioning System (GPS) and its many equivalents (e.g., GLONASS and others). These systems use a constellation of satellites providing accurate signals that are received and interpreted to provide useful and accurate positioning data. Depending on the sophistication of the receiver, positioning information accuracy typically ranges from ten meters to a few centimeters. Terrestrial systems can use GPS and its brethren to then survey relative to GPS-determined sensor position.

Separately, there are many applications where an accurate map of a local area is required and common ways of producing these localized maps include, but are not limited to, using cameras and lidar. These sensors can capture local information within their Field of View (FOV) and, through complex geometry, build point clouds and 3D models of their environment.

Some systems combine tracking and modeling mechanisms such as Simultaneous Localization and Mapping Systems (SLAM) used in robotics to determine position and/or pose and to construct a usable map of the environment.

These localization and mapping systems all suffer from varying degrees of drift, which is typically the result of accumulated error over distance. System drift can vary up to several percent of total length traveled. Lower drift rates result in better maps, but if a correction can also be applied, then the map can be made significantly better. In many cases, if the travel loop can be closed where the end point circles back to the beginning point, known techniques such as Iterative Closest Point (ICP) and loop closure can be used to improve and correct the map. However, in many cases such as traveling along a road and not returning to the start point, that option is not available nor is it convenient.

In the description that follows, there are described exemplary and non-limiting embodiments of novel systems that provide high accuracy map construction by tracking mapping sensors using GPS for exterior applications or tracking survey tools for interior applications.

SUMMARY

In accordance with an exemplary and non-limiting embodiment, a method comprises receiving a trajectory dataset comprising a plurality of geospatial points forming a point cloud and acquired along a trajectory wherein for each of the plurality of geospatial points there is a defined an x-coordinate, a y-coordinate and a z-coordinate and at least one mapping device orientation attribute, segmenting the trajectory dataset into a plurality of segments, determining at least one relative constraint for each of the plurality of segments and utilizing, for each of the plurality of segments, at least one of the determined relative constraints to determine a relative position of at least two of the plurality of segments. There may also exist a plurality of information related to each point including color, intensity, material properties, etc that may also be captured. These attributes may be gathered by other sensors such as cameras, or processing of related data.

In accordance with an exemplary and non-limiting embodiment, a method comprises deriving a first trajectory file comprising point cloud data created by a mapping system operated along a first trajectory, deriving a second trajectory file comprising position information from a GPS data source along a second trajectory, synchronizing the point cloud data with the position information and utilizing the second trajectory file to correct the point cloud data.

In accordance with an exemplary and non-limiting embodiment, a method comprises generating a point cloud comprising both spatial and pose data from a mapping system comprising a LIDAR and a retro-reflector along a first trajectory, receiving, while generating the point cloud, data from a total station comprising a second trajectory the received data comprising a position of the mapping system relative to a position of the total station and adjusting the first trajectory based, at least in part, on the second trajectory.

In accordance with an exemplary and non-limiting embodiment, a system comprises a mapping system comprising a LIDAR, a retro-reflector, and a processor wherein the processor encoded with instructions that when executed cause the mapping system to generate a point cloud comprising both positional and pose data, receive, while generating the point cloud, data from a total station comprising a second trajectory the received data comprising a position of the mapping system relative to a position of the total station and adjust the first trajectory based, at least in part, on the second trajectory.

BRIEF DESCRIPTION OF THE FIGURES

FIG. 5 is an illustration of a flowchart of an exemplary and non-limiting embodiment.

FIG. 6 is an illustration of a flowchart of an exemplary and non-limiting embodiment.

DETAILED DESCRIPTION

Figure 1:
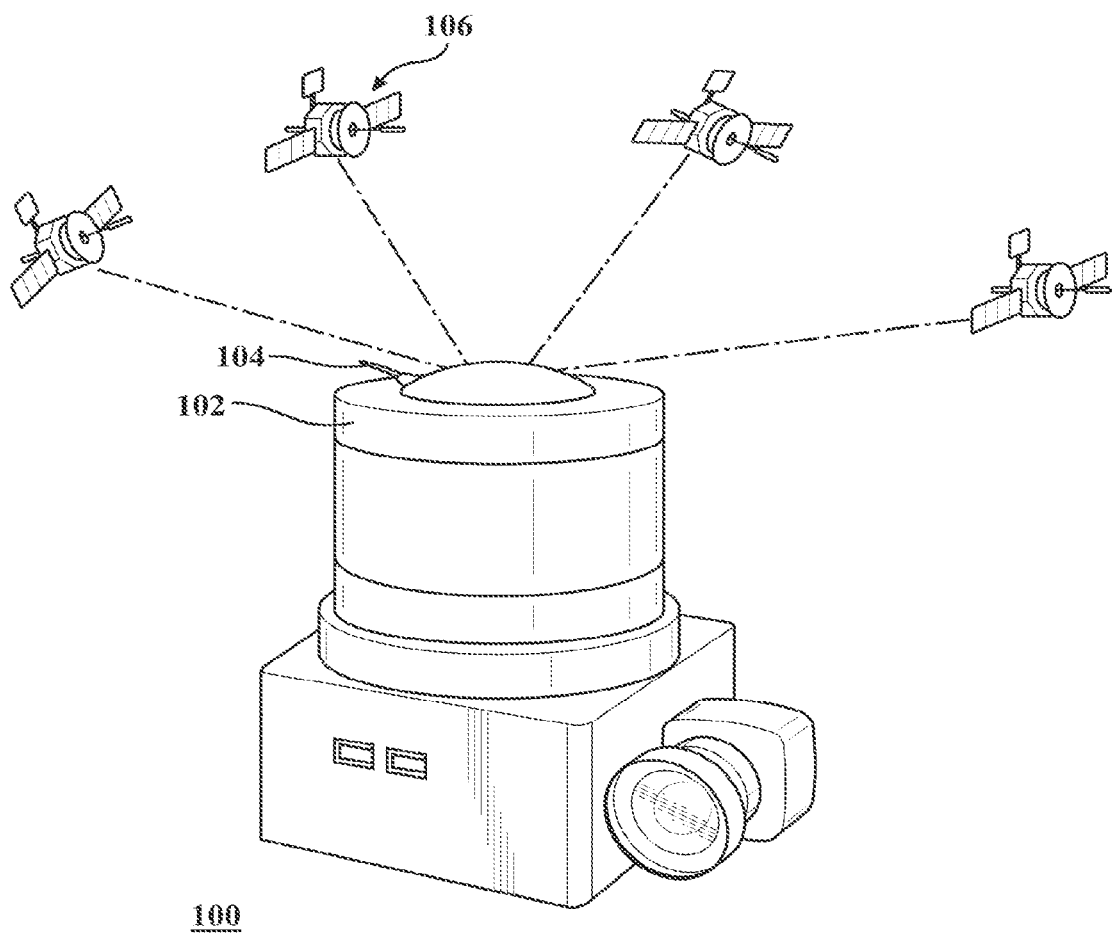
FIG. 1 illustrates an exemplary and non-limiting embodiment of a block diagram of a mapping system.

The use of Simultaneous Localization and Mapping (SLAM) devices in the production of point clouds is described, for example, in WO 2019/018315, entitled "ALIGNING MEASURED SIGNAL DATA WITH SLAM LOCALIZATION DATA AND USES THEREOF," published on Jan. 24, 2019, which is incorporated herein by reference in its entirety and for all purposes.

In accordance with the following exemplary and non-limiting embodiments, locally created map data and GPS data are gathered in parallel. Using this simultaneously gathered information allows users to geo-locate difficult outdoor scans where GPS signal is often lost or of poor or marginal quality. Such a use of information takes advantage of the complementary capabilities of absolute information from GPS and relative information from SLAM. As described below, this methodology does not require users to create connected loops, such as connecting start and end points. In essence, the acquisition and use of GPS data facilitates closing the loop between any two points with GPS data.

As used herein "loop closure" refers to accurately defining a geospatial coordinate of an initial point or set of points of a data set comprising a scan acquired over a period of time and distance and accurately defining a geospatial coordinate of a final point or set of points of the data set. In the instance that the initial and final points represent the geospatial coordinates of the same physical feature, such a loop closure may refer to the closing of an actual loop wherein the scanning device creating the data set has returned to a point of origin for the scan. Knowing that data points acquired at the beginning and terminus of a scan represent the same geospatial location allows one to spread any error present in the intervening data points across the whole of the data set, thus improving overall accuracy of the scan. However, whether or not a physical loop is closed in such a fashion, loop closure refers to any instance in which the starting and ending point locations are accurately known, whether such points represent the location of an identical physical feature or not.

In accordance with exemplary and non-limiting embodiments, correcting location information of points in a scanned point cloud is an optimization methodology that takes different pieces of information describing a traveled path including location estimates of acquired points along the way and combines them with some weighting on those estimates.

Such weightings are typically defined in a covariance matrix. For example, a covariance matrix may define a z-coordinate position well while indicating a lack of confidence in a y-coordinate and/or an x-coordinate. Likewise, a covariance matrix may indicate high confidence in a device's pitch while indicating lower levels of confidence in roll and/or yaw angles of the device. In some embodiments, a process starts with information comprised of the point cloud trajectory that was generated live while mapping with the mapping system. From this point cloud trajectory, one may estimate the trajectory of the mapping system. One has all of the point cloud data that is associated with the trajectory.

Then full point cloud representing the trajectory of the scan is broken into segments. In some embodiments, segments are created based on a weighting of the segments' accuracy. In other embodiments, segments may be created automatically such as by breaking the scan at junctures representing, for example, five seconds worth of acquired data.

One may then consider each segment and, for each segment, create relative constraints on the adjacent segments that overlap with each other based on mapping information. For example, one may define the 6 degree of freedom association and weight between two adjacent and overlapping segments based on point to point matching and represent that matching "weight" in a 6×6 covariance matrix that functions, in effect, like a complex spring connecting two segments of data with some stiffness/flexibility that represents the confidence of the relative alignment. There may therefore be deduced a relative position of segments and corresponding point cloud data.

Such scan matching allows one to recalculate the covariance matrix between two such related segments so that one might, for example, identify two segments as being two flat planes with a well aligned z-coordinate measurement but possibly lacking alignment in the x- and/or y-coordinates.

As described more fully below, for points that are, in our example, five seconds apart, one may ascertain that at a scanning start point there was observed a first GPS reading and at a scanning end point there was observed a second GPS reading. These two GPS readings create additional constraints that may be utilized in the aforenoted optimization along with covariance matrices, representing confidence, associated with these GPS constraints.

In some embodiments, one may choose to use GPS data directly, for example by filtering to only use data with a high accuracy level (or "fix quality"). In other embodiments, one may pre-filter the GPS data to average or smooth the data to improve and filter points of low accuracy before adding the data to the optimization. In either case, knowledge of the associated error and covariance is critical for the optimization.

As noted above, loop closure may employ an optimization "graph" that breaks the generated point cloud into continuous time segments. One may then add relative constraints based on the initial relative position (from our mapping result) of overlapping segments in the map and absolute constraints from GPS. One may then run an update step in the optimization to reduce the global drift of the scan matching solution. However, if one or a few GPS points disagree with the other constraints, their impact will be largely overridden, provided the majority of the data is of high accuracy. As noted above, actual loops are not required for this method to work, drift can be improved along a straight line path, for example.

Next, one may search for older data that is nearby that might represent a loop closure and run scan matching between the possibly repeated segments. If a match is detected, one may add a new relative constraint to those segments and run an update step in the optimization again. The incorporation of GPS data before searching for loops, dramatically reduces the search space for identification of possible matches and reduces the chances of introducing a false positive loop closure.

With reference to FIG. 1, there is illustrated an exemplary and non-limiting embodiment of a mapping device or system 100 comprising a LIDAR data acquisition component 102 and a GPS receiver 104. As illustrated, the GPS receiver makes use of positioning information received from a plurality of satellites 106.

GPS-based loop closure uses the GPS location data to provide loop closure. For example, GPS data may be used in large datasets where drift accumulates over kilometers of driving and where loop detection does not work since no loops are created in long non-returning traverses. Using GPS data to correct the trajectory in the first place, loop detection works to match multiple scans and precisely close the loop.

In one embodiment, an approach comprises aligning the trajectory with the GPS data. With time-synchronized data, the two data streams may be combined to form a common timeline of where one system thinks it is (mapping) and where it is via GPS or other means (geo-location).

In accordance with an exemplary and non-limiting embodiment wherein global positioning systems lack synchronized timing with mapping devices, one method involves matching the velocity profile and subsequently aligning the timing. Such a methodology requires at least two separate trajectory files, one from the mapping system, and the other from a separate GPS or total station, described more fully below.

Software executing on a processor may be used to precisely match the timing between the trajectories and to subsequently correct the map. An embodiment may start with an initial guess of the timing offset between two trajectory files and calculate a cross correlation between the two files to adjust the time offset. This cross correlation may be performed, for example, on the velocity with respect to time or the position offset from starting point with respect to time.

In one approach, speed is utilized instead of velocity, (speed being the scalar component of the velocity vector) and the speed profiles of the two or more data sets are correlated. This may be done in multiple ways including, but not limited to, by maximizing the sum of the products by adjusting the time offset or by maximizing the $R^2$ residual for a linear-least squared fitting of synchronized speed pairs. The loop closure method does not require a continuous correction signal, and this coupled with this post-process calculation method to develop correlation of two independent trajectory maps solves multiple problems in many diverse environments. GPS and external tracking stations may be used alone or in parallel, and do not need to be clock-synchronized to be used to correct for position and pose errors.

In some embodiments, the use of GPS encompasses the addition of a stationary base station to improve the accuracy of the GPS data. In some instances, the position of the base station is precisely observed and stored. Subsequently, GPS readings of the base station are recorded over the same period time that mapping device 100 records data, including the GPS position of the mapping device 100. Because the stationary position of the base station is precisely known, differences in its observed GPS position over time represent errors in the measured GPS data. These errors may be subtracted out of measured GPS coordinates of the mapping system 100 in order to provide precise GPS coordinate data of the mapping system 100. This is also referred to as differential GPS.

In some places, this offset data representing the drift in GPS acquired location data does not require access to a stationary base unit. Rather, such data is published and is available. For example, in California, such data is available throughout the entire state as part of what are called real time kinematic or RTK GPS systems. In such instances, a network of numerous fixed base stations are arranged to cover an area. The use of a plurality of base stations is required because noise can vary from station to station or one location with respect to another. Typically, proximity to a base station on the order of approximately 10 kilometers is required to derive a GPS location with an accuracy of a couple of centimeters.

Figure 2:
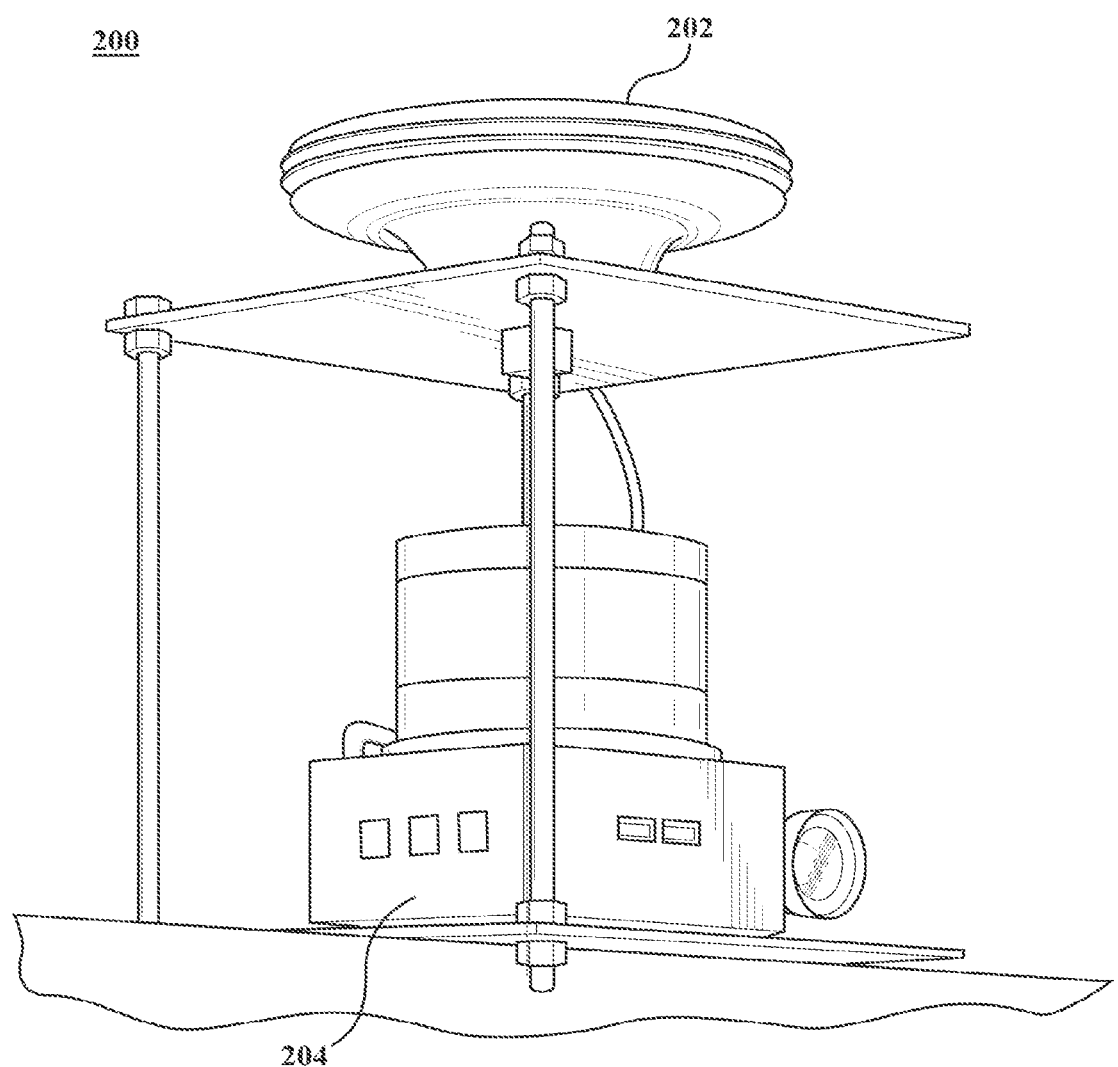
FIG. 2 illustrates an exemplary and non-limiting embodiment of a GPS receiver rigidly mounted to a mapping system.

An example non-limiting and exemplary test setup is illustrated with reference to FIG. 2. Mapping device 200 collects both GPS and point cloud data by rigidly mounting a GPS receiver 202 with respect to a mapping system 204. In the illustrated embodiment, the GPS receiver 202 is shown mounted above a LIDAR and camera mapping system 204. The mounting configuration in this design obscures very little of the LIDAR field of view.

Figure 3A:
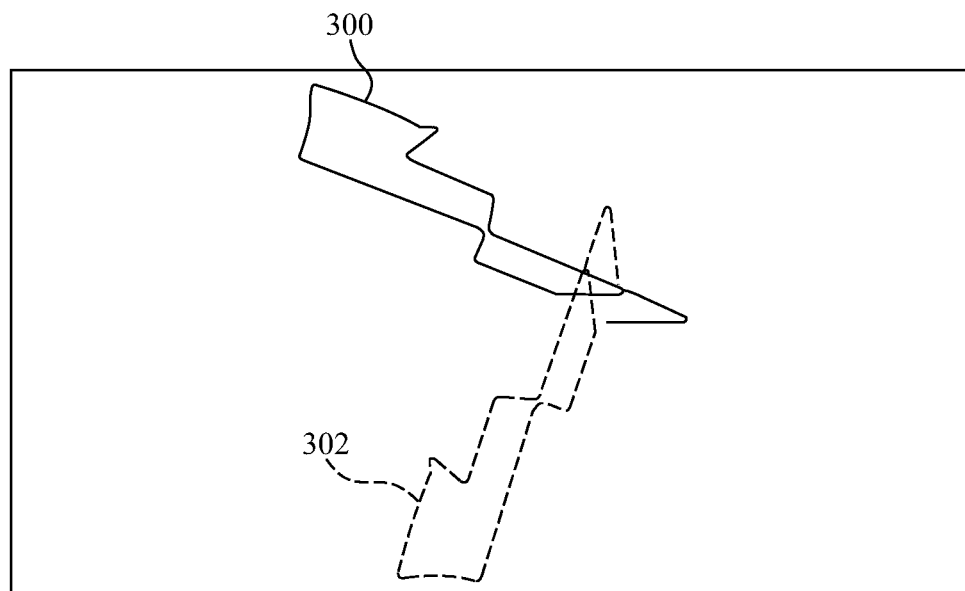
FIG. 3A is an illustration of both a GPS trace and a raw trajectory from the mapping system in accordance with an exemplary and non-limiting embodiment.

Data paths resulting from data collection using such a system may overlap, but do not require revisiting the beginning of the path as in some forms of loop closure. Such results are illustrated with reference to FIG. 3A. FIG. 3A is an illustration of both a GPS trace 300 and a raw trajectory 302 from the mapping system. Note that the traces 300, 302 are not necessarily acquired in the same coordinate system. As a result, it is evident that the two traces 300, 302 can be snapped one to the other via a coordinate transformation.

Figure 3B:
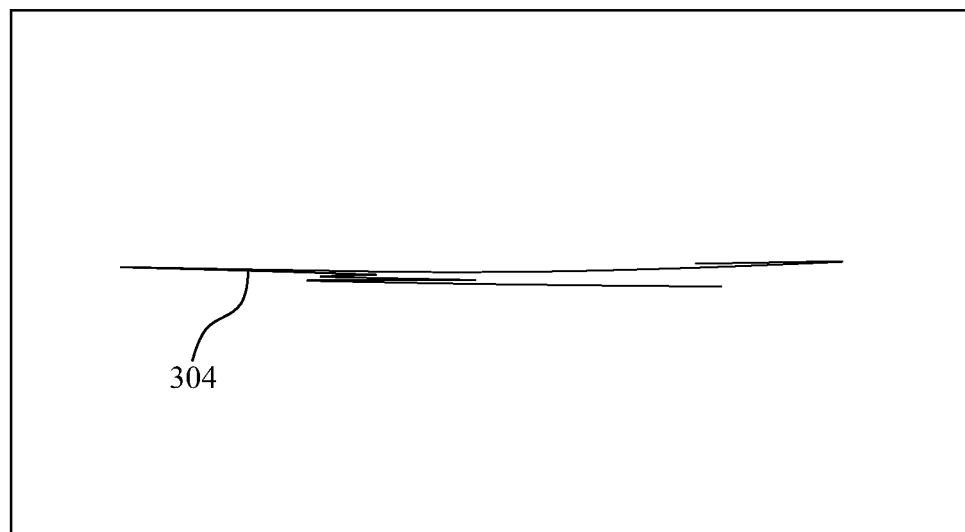
FIG. 3B is an illustration of a perspective rendering of a trajectory exhibiting z-direction drift in accordance with an exemplary and non-limiting embodiment.

With reference to FIG. 3B, there is illustrated an exemplary embodiment of a perspective rendering of a trajectory 304 exhibiting z-direction drift.

The two data sets 300, 302 from GPS and from the localization and mapping system may be combined in a novel and accurate way that corrects the small amount of drift in the self-contained mapping system with data from GPS.

Concurrently collected GPS and mapping system data may be transformed to GPS corrected coordinates and loop closure. This requires the point cloud, the trajectory, and minimum GPS data: time, latitude, longitude, and altitude. Loop closure does not require that the scan and traverse end at the beginning. As long as there is reliable GPS data, the point cloud can be adjusted to the GPS data.

Additional useful information in this scenario may comprise a measure of GPS accuracy, which is used to align and adjust the point cloud based on error magnitude. This process works well with GPS and mapping system generated maps on long courses, kilometers or longer, that does not start and stop at the same point.

In accordance with some embodiments, location information may be used to align and correct the point clouds that form the basis for the map and the models. The geo-located set of positions do not even need to be continuous, they can be intermittent and even be infrequent and spaced unevenly. This ground-truth information may be used to adjust and align the point clouds resulting in very accurate maps. The mapping and aligning uses an Iterative Closest Point (ICP) technique to adjust the point clouds and make the adjustments in the local point clouds associated with the positions of the GPS and related data.

In accordance with various exemplary and non-limiting embodiments, a total station is an electronic/optical instrument used for surveying and building construction. The total station may be an electronic theodolite (transit) integrated with an electronic distance measurement (EDM) to read distances from the instrument to a particular point, and an onboard computer to collect data and perform advanced coordinate based calculations.

In some embodiments, a robotic or tracking total station may use a retro-reflector or prism to find the location of the retro-reflector and continuously tracks the position of the reflector even as it moves in the environment. As long as line-of-sight is maintained, the robotic total station will provide a full accounting of the path of the retro-reflector in the environment.

Figure 4:
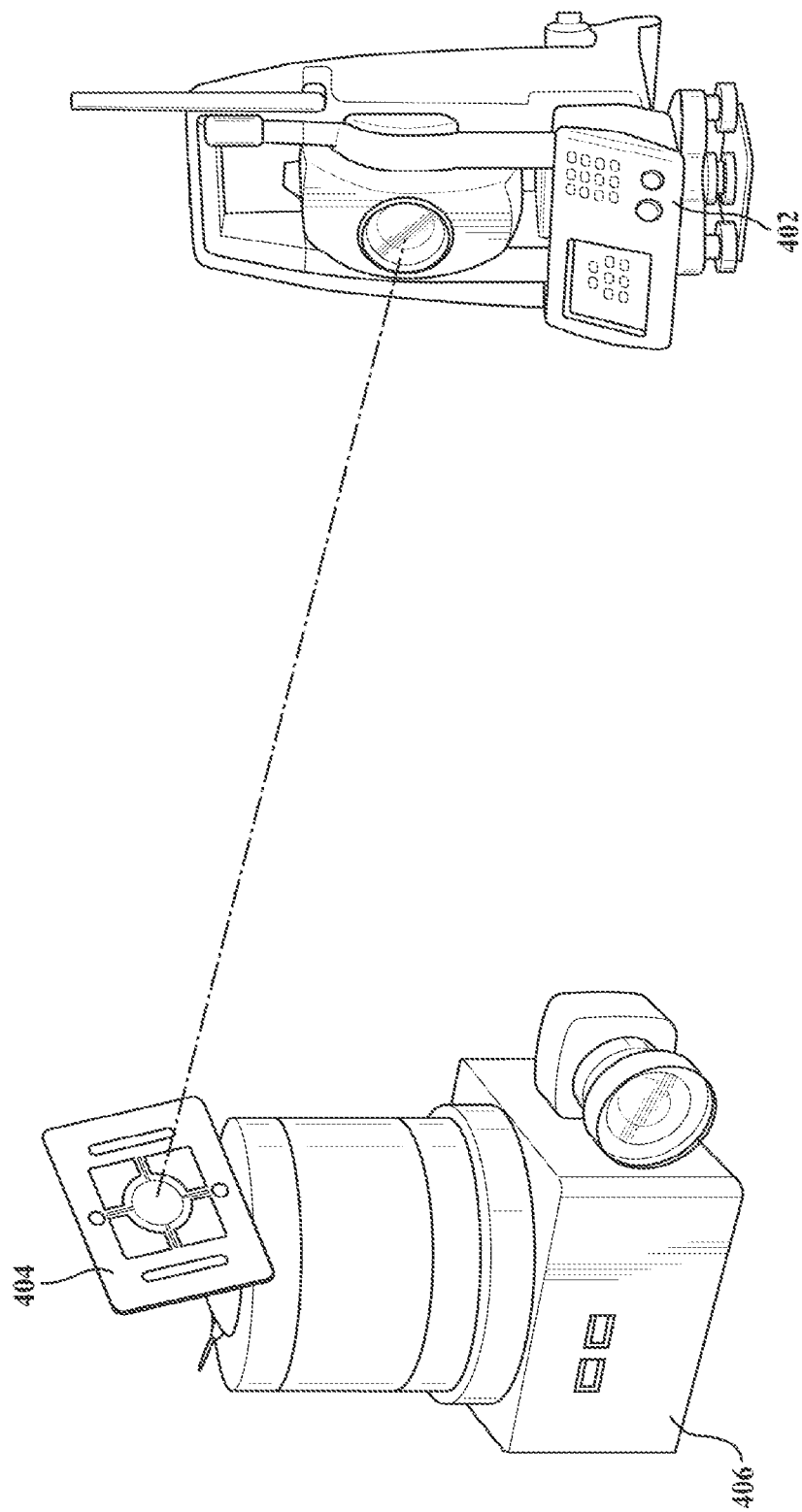
FIG. 4 is an illustration of an exemplary and non-limiting embodiment of a robotic total station set up in a local environment and a retro-reflector mounted to a mapping and localization system.

With reference to FIG. 4, there is illustrated an exemplary and non-limiting embodiment of a robotic total station 402 set up in a local environment and a retro-reflector 404 is mounted to a mapping and localization system 406. As the mapping system 406 moves, the robotic total station is able to find the path and trajectory of the mapping system 406 as it moves through the environment.

First, the total station 402 obtains a geo-located position using GPS or similar geo-location system. The total station 402 is then moved to the environment where tracking of the mapping systems 406 is required. Next, a retro-reflector 404 is mounted to the mapping system 406. The robotic tracking station 402 tracks by targeting and adjusting its pose relative to the target to keep the reflector in view and at a measured position. Even in the event the environment cannot receive a GPS signal, the total station information provides a local reference that is very accurate and can be used to close the loop on the x, y, and z position of the system during movement. Even when the system and retroreflector are not always in view (line of sight) this approach may provide useful discrete corrections and assist in closing the loop.

Simultaneously, the mapping system 406 has its own estimate of pose and location. The robotic total station 402 continues to track the position (XYZ) of the mapping system 406. As with the GPS/Mapping system described previously, the tracking total station 402 information provides local accurate information that can be used to adjust the mapping data collected by the mapping system 406 to even greater accuracy.

One example of a mapping sequence for a total station and mapping device is as follows:
1. Attach a tracking prism (retro-reflector) 404 to the top of the mapping device system 406.
2. Attach the mapping device 406 on top of a typical survey pole that would normally be used with a tracking total station 402.
3. Set up a tracking total station 402 in an area of interest and choose a starting location for the mapping device 406.
4. With the mapping device 406 in a stationary and fixed location, start the total station 402 data collection.
5. Start the mapping device 406 and once mapping begins move the mapping device 406 around the total station 402 and along the region of interest.
6. The total station 402 should be recording position (x, y, z) and time of recording for each point.

It does not matter if the tracking station data is interrupted while moving. The approach of linking a GPS to the mapping system or using a tracking total station to monitor mapping system position serves a similar purpose. In both embodiments, an external system provides ground truth that is used to adjust and carefully adjust the map into an even more accurate map.

Applications for this invention include, but are not limited to, the mapping and localization and sensing within tunnels, mines, caves, sewers, urban areas that are GPS denied, indoor malls, stadiums, airports.

In other embodiments, identifiable landmarks may be added to the scene being mapped to function as constraints for loop closure. For example, in construction sites it is common to have known surveyed points in a building, these may be tagged with an identifier that the mapping system can recognizes, for example an AprilTag that a camera can detect and associate with a number. These tags can then be used in a lookup table to find the absolute coordinates of that point in the cloud segment. That position can then be added as a loop closure constraint, much like a GPS or total station constraint.

Identifiable landmarks could also be used in the absence of surveyed points as a means to generate relative constraints on mapping by identifying closed loops, similar to the laser mapping based loop closure constraints. For example if a target is seen at two distinct times, the associated points may be constrained to be at the same xyz location. The surrounding cloud segments may then be refined in relative alignment through ICP or similar means.

Some mapping systems using internal sensing tend to exhibit x, y pose errors and z-drift. GPS assisted correction is very useful for solving this problem. Having an independent estimate of trajectory allows for lowering the required pose stack number in loop closure, which allows for correction of pose estimation errors in post processing. Pose stack number is the number of frames of laser data kept as one unified unit during processing. At 5 Hz, 5 frames of laser information equals 1 second of data.

There is no guarantee that a pose estimation error did not happen in that rigid pose stack group. A lower number during post processing increases processing time and increases chance of additional error, by way of a false positive match, being introduced. Having additional external constraints reduces the chance of new errors and increases probability that existing errors may be corrected.

Additional embodiments of gps-assisted loop closure may be formulated to run in real-time during processing. This is facilitated by a forward processing of the data in time, in which new time segments are constrained and matched to prior data matching only forward in time. Higher processor resources makes this practical as an extension and enhancement of the described embodiments. For example, corrections in a revised region while scanning may be feed back to the laser map being built and preclude double registrations, where new data has the potential to match to two alternate "versions" of the room (one from the initial visit and one with some drift from the revisit). Additionally live adjustments may significantly improve mapping performance in open outdoor spaces, which tend to produce poor laser mapping results, but typically have good GPS data, due to minimal interface from buildings or trees.

With reference to FIG. 5, there is illustrated a flowchart of an exemplary and non-limiting embodiment. At step 500, there is received a trajectory dataset comprising a plurality of geospatial points forming a point cloud and acquired along a trajectory wherein for each of the plurality of geospatial points there is a defined an x-coordinate, a y-coordinate and a z-coordinate and at least one mapping device orientation attribute. At step 502, the trajectory dataset is segmented into a plurality of segments. At step 504, at least one relative constraint for each of the plurality of segments is determined. At step 506, for each of the plurality of segments, at least one of the determined relative constraints is utilized to determine a relative position of at least two of the plurality of segments.

With reference to FIG. 6, there is illustrated a flowchart of an exemplary and non-limiting embodiment. At step 600, a first trajectory file comprising point cloud data created by a mapping system operated along a first trajectory is derived. At step 602, a second trajectory file comprising position information from a GPS data source along a second trajectory is derived. At step 604, the point cloud data with the position information is synchronized. At step 606, the second trajectory file is utilized to correct the point cloud data.

While only a few embodiments of the present disclosure have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. The present disclosure may be implemented as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platform. A processor may be any kind of computational or processing device capable of executing program instructions, codes, binary instructions and the like. The processor may be or may include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor, or any machine utilizing one, may include non-transitory memory that stores methods, codes, instructions and programs as described herein and elsewhere. The processor may access a non-transitory storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server, cloud server, and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service (SaaS), platform as a service (PaaS), and/or infrastructure as a service (IaaS).

The methods, program codes, and instructions described herein and elsewhere may be implemented on a cellular network has sender-controlled contact media content item multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media has sender-controlled contact media content item a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices has sender-controlled contact media content item artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "haa sender-controlled contact media content item," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure.

All documents referenced herein are hereby incorporated by reference.

What is claimed is:

1. A method comprising:
   receiving a trajectory dataset comprising a plurality of geospatial points forming a point cloud and acquired along a trajectory wherein for each of the plurality of geospatial points there is a defined an x-coordinate, a y-coordinate and a z-coordinate and at least one mapping device orientation attribute;
   segmenting the trajectory dataset into a plurality of segments;
   determining at least one relative constraint for each of the plurality of segments;
   utilizing, for each of the plurality of segments, at least one of the determined relative constraints to determine a relative position of at least two of the plurality of segments;
   comparing data from a first segment to data from a second segment to detect a match; and
   adding a new relative constraint derived from the match to each of the first and second segments.

2. The method of claim 1, wherein the segmenting comprising segmenting the trajectory dataset is based, at least in part, on a weighting of at least one of the plurality of segments.

3. The method of claim 1, wherein the at least one mapping device orientation attribute comprises at least one of a degree of mapping device orientation freedom.

4. The method of claim 1, wherein segmenting comprises segmenting the trajectory dataset into a plurality of segments each comprised of data gathered during a generally similar and predetermined period of time.

5. The method of claim 1, wherein the utilizing further comprises calculating a covariance matrix between at least two of the plurality of segments.

6. The method of claim 1, wherein at least one of the at least one mapping device orientation comprises GPS data comprising a plurality of GPS data points.

7. The method of claim 6, wherein the GPS data is selected based, at least in part, on a confidence measure of the GPS data.

8. The method of claim 6, wherein the GPS data is pre-filtered to remove bad GPS data points.

9. The method of claim 1, further comprising performing an optimization of the trajectory dataset utilizing the newly added relative constraint.

* * * * *